March 12, 1957     H. V. HANSEN     2,784,883
SEED DISPENSING ASSEMBLY FOR PLANTER
Filed March 25, 1955     2 Sheets-Sheet 1

INVENTOR.
HAROLD V. HANSEN

INVENTOR.
HAROLD V. HANSEN

United States Patent Office 2,784,883
Patented Mar. 12, 1957

2,784,883

SEED DISPENSING ASSEMBLY FOR PLANTER

Harold V. Hansen, Hillsdale, Ill., assignor to Deere & Company, Moline, Ill., a corporation of Illinois Application March 25, 1955, Serial No. 496,768

13 Claims. (Cl. 222—223)

This invention relates to seed planters and is particularly concerned with planters of the type used for planting cotton seed, corn, and other similar varieties of seed. More particularly, this invention relates to the seed hopper on a planter and the seed dispensing assembly normally mounted in the bottom of the hopper.

Characteristic of one of the common present day corn and cotton planters is a seed dispensing assembly which incorporates the use of a rotary disk having peripheral seed cells and which is mounted in the base of the seed hopper where the cells may collect seed as the disk rotates. The disk passes under a seed ejecting mechanism which causes the seed to be discharged from the cells and through a discharge port in the base of the hopper. As can be readily understood, the size and characteristic of the seed cells required, as an example, to plant corn is substantially different than that required to plant cotton seed, peanuts, or other varieties of seeds. Therefore, the disk is usually of the removable and replaceable type, and simple provisions are made to replace one type of disk with another type.

Cotton, in most parts of the country, is planted by dispensing the seed from the planter in drilled rows. Following the planting and after the initial growth of the plants the excess cotton plants, which are created by an excess of seed being dropped from the planter, are removed from the field by a subsequent thinning operation. Basically, therefore, considerable expense is created in this method of planting cotton seed not only by the excess amount of cotton seed used but also by the condition created which requires a separate operation to remove plants growing from the excess cotton seed. Considerable economic advantage is therefore offered by precision drilling cotton seed which places the seed in the earth in specified numbers and at determinable spaced intervals, thus eliminating the use of excessive seed as well as the required subsequent thinning operation. It is, therefore, the primary object of this invention to provide an improved seed dispensing assembly of the type described which is particularly suitable for precision drilling cotton seed.

In precision drilling cotton seed, the seed disk used is characterized by having relatively small peripheral seed cells which will permit a very limited number, which is usually one, of seeds in each cell. Cotton seed in its natural state is characterized by having a considerable amount of lint and has a tendency to stick or adhere to other cotton seed with the ultimate result that it is usually found in clusters of comparatively large numbers. In precision drilling cotton there has been a considerable amount of difficulty in separating the seed so that it will pass individually or in small quantities into the small cells of the disk. This problem has been partially overcome by treating the seed with a delinting agent which removes the lint thereby making it comparatively easy to separate. Due to the additional expense of treating cotton seed in this manner and to the fact that it is not a perfect solution to the problem, this method has not been completely satisfactory.

It is therefore also an object of this invention to provide a seed dispensing mechanism that is particularly adapted to be used in precision drilling untreated or partially treated cotton seed and which incorporates a vigorous agitating mechanism operative within the seed hopper to cause both treated and untreated cotton seed to separate. Incorporated in the agitating mechanism is drive means which is directly operative from the seed disk and which permits the entire seed dispensing mechanism including the drive means to be removed from the planter as well as the seed disk. This in effect makes the entire mechanism an attachment for a standard planter.

It is a further object of this invention to provide a new and novel seed ejecting means for removing seed from the cells that is cheaply produced and that is particularly adaptable for use in the aforesaid seed dispensing mechanism.

Other objects and advantages of the invention will become apparent to those skilled in the art as the nature of the invention is better understood from the following detailed description illustrated in the accompanying drawings.

Fig. 4 is an exploded perspective view of the seed dispensing mechanism.

Fig. 5 is a sectional view taken substantially along the line 5—5 of Fig. 3.

Figure 1:
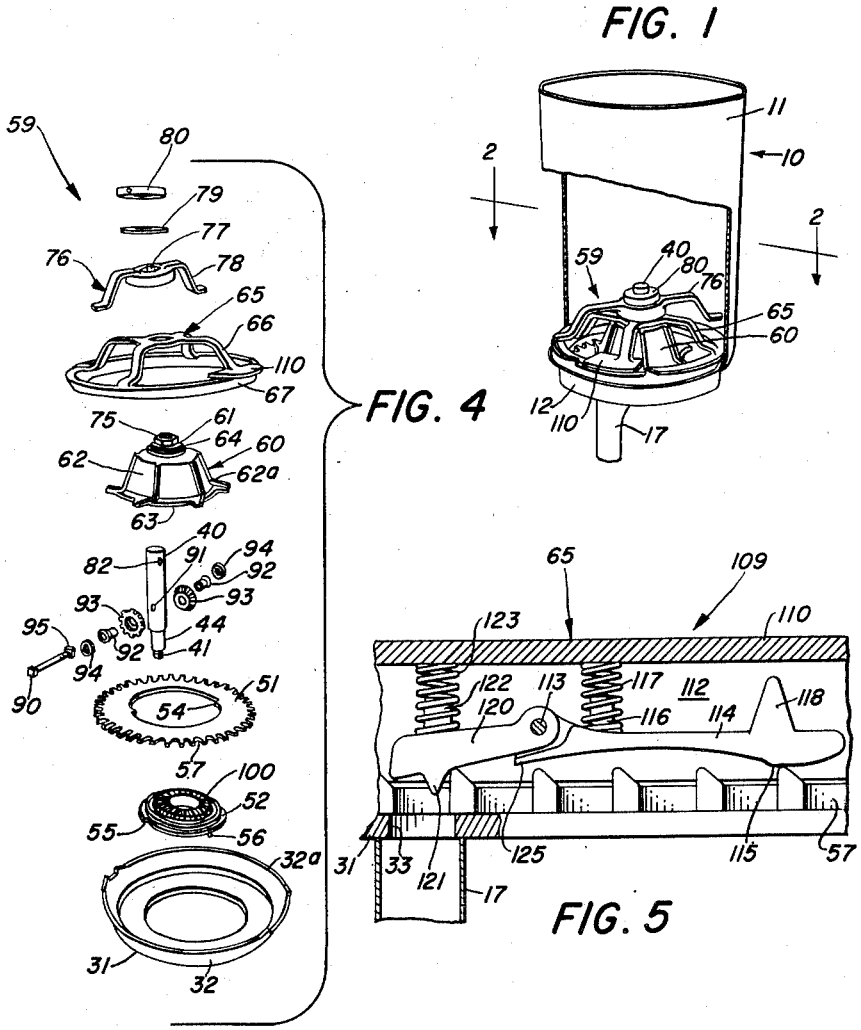
Fig. 1 is a cut-away view of the seed hopper which incorporates the invention.

Referring first to Fig. 1, reference numeral 10 indicates a common type seed hopper which is adapted to be mounted on a planter, not shown, comprising an upright metal cylinder portion 11 which is fixed, as by welding or other suitable means, at its lower edge to a hopper under plate 12. The under plate 12 has a centrally positioned boss 13 (Fig. 3) having a threaded bore 14. The plate 12 also has an opening 15 through which a seed dispensing funnel 17 extends and an opening 16 through which the upper portion of a pinion 18, which is mounted on a drive shaft 19, may pass. The drive shaft 19 is supported from the base of the hopper by means of a bracket 20 and is driven by suitable drive means from the planter.

An annular shoulder 30 is provided in the under plate 12. Resting on the shoulder 30 is a hopper base plate 31 which has an upright annular wall portion 32 with its upper lip 32a abutting against the upright portion of the under plate 12 thereby preventing seed from passing through the hopper other than through a seed discharge port 33 provided in the hopper base plate 31. Depending lugs 34 are registrable in corresponding bores 35 in the shoulder 30 and fixes the hopper base plate 31 against rotation.

Figure 3:
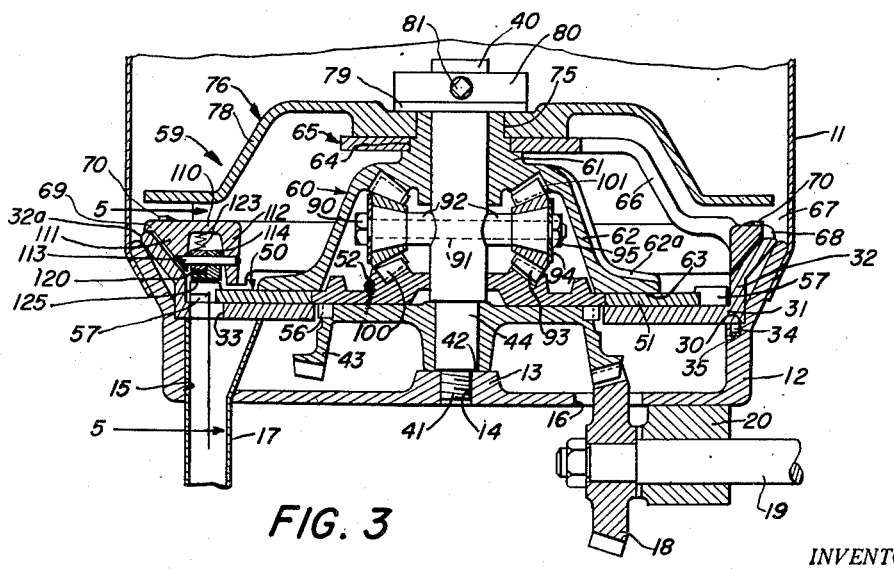
Fig. 3 is a sectional view taken substantially along line 3—3 of Fig. 2.

A vertical supporting shaft 40 is fixedly but removably mounted at a lower threaded end 41 in the corresponding threaded bore 14 and extends upwardly into the hopper. A shoulder 42 on the shaft 40 abuts the upper surface of the boss 13. Also abutting the upper surface of the boss 13 is a hub of a bevel gear 43 that meshes with the pinion 18 and which, as will later become apparent, serves as a drive means operative from the planter to drive the seed dispensing assembly. As shown in Fig. 3, the shaft 40 has a reduced portion 44 precisely the length of the hub thereby restricting axial movement of the gear. The gear 43 is positioned radially inwardly of the hopper base plate 31 and in conjunction with the hopper base plate serves as a false bottom to the hopper.

Overlying and adjacent to the bevel gear 43 and the base plate 31 is a seed disk 50 comprising an outer annular disk 51 and an inner drive member 52. As shown specifically in Fig. 4, the annular disk 51 is connected to its drive member 52 by means of radially inwardly extending portions 54 that fit into corresponding indentations 55 in the periphery of the drive member 52. The purpose of producing the seek disk in two portions is of course to provide means for easily removing and replacing the annular disk to correspond to the type of crop then being planted. Lugs 56, depending from the drive member 52, are receivable in suitable openings in the upper surface of the gear 43 thereby causing the disk and gear to rotate about the shaft 40 in unison. The annular disk 51 has peripheral seed cells 57 which, upon rotation of the disk, pass consecutively over the seed discharging port 33.

A seed agitating mechanism, referred to in its entirety by reference numeral 59 (Figs. 1 and 3), is disposed within the hopper and directly above the seed disk 50. It includes a lower agitating member 60 which has a hub portion 61 rotatably mounted on the supporting shaft 40 and a dome-shaped portion 62, having radial fin like projections 62a, extending radially outwardly and downwardly from the hub portion 61 to a lower edge 63 which normally abuts the upper surface of the annular disk 51. The hub portion 61 extends axially upwardly along the shaft 40 from the dome-shaped portion 62 and has a cylindrical surface 64 for receiving a ribbed member 65 having radially outwardly and downwardly extending arms or legs 66. The outer ends of the legs 66 are interconnected by an integral ring 67 which in turn is held against rotation by radially extending lugs 68 and 69 that are receivable between upwardly extending and rigid portions 70 extending from the upper lip 32a of the hopper base plate 31.

The upper end 75 of the hub 61 has a hexagonal shaped cross section and has mounted thereon an upper agitating member 76 which has a corresponding hexagonal opening 77. The upper agitating member is shown, for purposes of this disclosure, as having a pair of radially oppositely extending legs 78. A suitable washer 79 is mounted on the shaft 40 above the upper agitating member, and a ring member 80 having a set screw 81 that is receivable in a tapped opening 82 in the supporting shaft 40 is mounted above the washer 79 and serves with the shaft to secure the entire mechanism in the hopper.

The vertically disposed supporting shaft 40 also has fixed thereto a radially extending bolt 90, which serves as a gear support or shaft, and which extends through an opening 91 in the shaft 40. Tapered bushings 92 are provided on the gear shaft 90 and, as shown in Fig. 3, limits movement of the shaft 90 in its axial direction. Rotatably mounted on the bushings 92 are gear means, here shown in the form of bevel gears 93. Washers, as at 94, and a nut, as at 95, secure the gear means in a fixed relationship relative to the shaft or bolt 90. The vertically disposed shaft 40, being held against rotation at its lower end, serves as means for fixing the gear shaft or support 90 against movement relative to the hopper.

Provided on the upper surface of the drive member 52 is a crown bevel gear 100 that engages the bevel gears 93. Provided on the under surface of the dome-shaped portion 62 of the lower agitating member is a crown bevel gear 101 which also engages the bevel gear 93. As shown specifically in Fig. 3, therefore, the depending portion 62 of the lower agitating member 60 contains within itself the agitator drive means, as represented by the crown gears 100 and 101 and the bevel gears 93 and the corresponding supporting members, and serves as a protective coverage from the seed contained in the hopper.

The seed agitating mechanism 59, other than the seed ejector which will later be explained, operates in the following manner. The drive means from the planter drives the disk 50, comprising the drive member 52 and the annular disk 51, in one direction of rotation. The lower agitating member 60 is driven in an opposite direction by the bevel gears 93 and crown gears 100, 101 causing the fin portions 62a to create an agitating action between the disk 51 and the edge 63 of the lower agitating member 60. The upper agitating member 76 rotates in unison with the lower agitating member and creates a vigorous agitating action between the upper and lower agitating members and the fixed legs 66 of the ribbed member 65. Due to the contour of the fin 62a the seeds will be driven radially outwardly where they will be picked up by the seed cells in the annular disk 51 and will be passed under the ejecting mechanism 109 which will presently be described.

Figure 2:
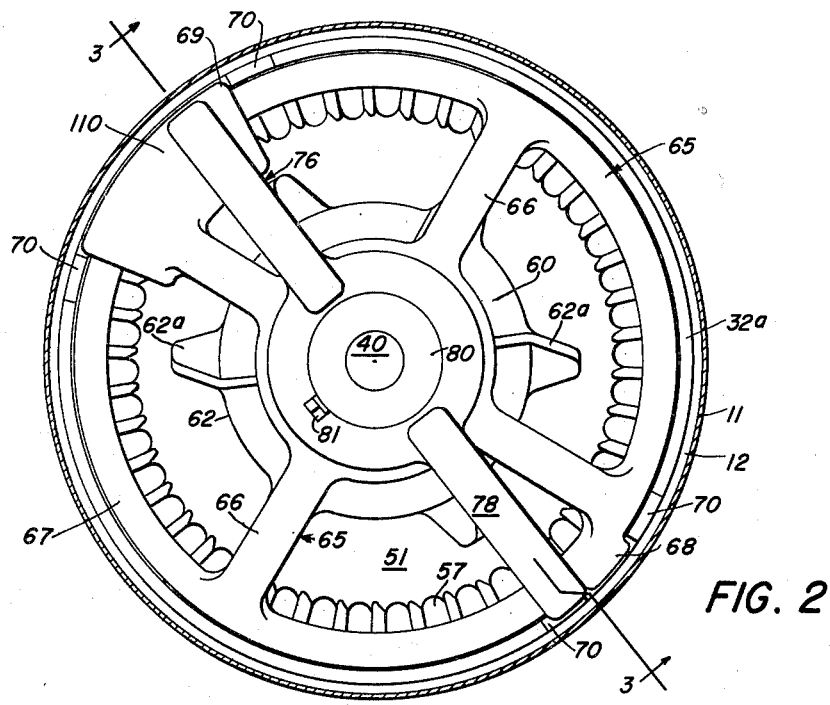
Fig. 2 is a sectional view of the seed hopper taken along line 2—2 of Fig. 1.

The seed ejecting mechanism 109 (Fig. 5) is positioned above the outer periphery of the seed cells 57 and is enclosed from above and on both sides by a rigid elongated U-shaped member 110, and from beneath by the annular disk 51. The rigid member 110 is an integral part of the rib member 65 and consequently is fixed against rotation. As shown in Figs. 2 and 5, it has an arcuate length sufficient to cover substantially five of the seed cells 57 in the disk 51. Depending portions 111 and 112 respectively of the rigid member 110 support a pivot member or pin 113 that transverses the space between the portions. Mounted on the pivot member 113 for vertical swinging toward or away from the seed cells 57 is a first elongated part 114 which has a lower surface 115 slidably engaging the top of the seed cells 57 thereby limiting the quantity of seed in each of the cells. Integral with a mid-portion of the elongated part 114 is a cylindrical shaped stub 116 which projects from the upper surface of the part 114 and has mounted thereon spring means 117 biasing the elongated part downwardly. Also projecting from the upper surface of the member 114 is an inverted wedge-shaped portion 118 which prevents seed from entering from the open end of the rigid member 110.

A second elongated part 120 is also pivotally mounted on the pin 113 for movement toward or away from the seed cells 57. The second elongated part is characterized by having a rigid projection or lug 121 that is in vertical alinement with the seed discharge port 33 in the hopper base plate 31 and is operative to move in or out of the seed cells 57 as they pass under the lugs 121. Integral with the upper surface of the second elongated part 120 is a short cylindrical stub 122 that extends upwardly toward the upper portion of the rigid member 110. Mounted on the stub 122 is a biasing or spring means 123 which resists upward movement of the part 120 and biases the lug 121 into the seed cells.

One-way stop means here in the form of an extension 125 of the first elongated part 114 underlies the second elongated part 120 and is positioned to intercept the part 120 thereby limiting movement of the parts 114, 120 toward one another.

The seed ejecting means operates in the following manner. As the seed disk 51 rotates, the cells 57 will pass under the seed cut-off surface 115 of the elongated part 114 which, being biased downwardly by the spring 117, will limit the number of seed in the seed cells. The individual seed cells 57, having passed under the cut-off member 114, then travel to the opposite end of the seed ejecting mechanism to pass under the second elongated part 120, which is biased downwardly to cause the lug 121 to move in and out of the seed cell, resulting in the seed departing from the cell 57 and through the seed discharge port 33.

Viewing Fig. 5, it becomes apparent that, upon removal of the member 65 from the hopper 10, the first and second elongated parts 114, 120, being pivoted about pin 113 which is itself mounted on member 110, will be biased downwardly by their respective springs 117 and 122 only until the extension or stop 125 on the part 114 engages the underside of the part 120. When the parts 114 and 120 are in this position the biasing means 117 and 122 will maintain the seed ejecting mechanism in a relatively fixed state thereby permitting movement or replacement of the ribbed member 65 without automatically dismantling the mechanism. The inverted wedge-shaped portion 118 will limit movement of the part 114 toward the member 110 thereby in effect limiting movement of the part 120 away from the member 110. Conversely, the stub member 122 limits movement of the part 120 toward and movement of the part 114 away from the member 110. Thus, the springs 122 and 117 are mounted in the seed ejecting assembly in such a manner that a chance knock or blow against the parts 114, 120 will not dislodge them.

While only one form of the invention has been shown, it should be recognized that other forms and variations could exist without departing basically from the broad general principles herein disclosed. It should, therefore, be understood that while the preferred embodiment has been described with the view of clearly and concisely illustrating the invention, it is desired not to so limit or narrow the invention beyond that which is claimed.

What is claimed is:

1. An assembly for dispensing seed contained in a seed hopper mounted on a planter comprising: a vertically disposed supporting shaft fixed to the hopper and extending into the hopper and having fixed thereto a radially extending gear shaft with gear means mounted thereon; a rotary drive member rotatably mounted on the supporting shaft and having a toothed surface engageable with the gear means for driving the latter; a hopper base plate fixed against rotation and having a seed discharge port spaced radially from the supporting shaft; an annular disk overlying the base plate and having peripheral seed cells; means connecting the disk to the drive member to cause the disk to rotate resulting in the seed cells passing over the seed discharging port; a lower agitating member having a hub portion rotatably mounted on the shaft and a portion overlying and containing the gear means with a lower edge thereof abutting the disk and including means thereon engageable with the gear means whereby said agitating member will rotate oppositely to the annular disk; an upper agitating member spaced vertically from the lower agitating member and mounted on said hub for rotation in unison with the lower agitating member; a ribbed member fixed against rotation and having arms disposed between the upper and lower agitating members; means mounted on the hopper for positively ejecting seed from the seed cells as they pass over the seed discharging port; and drive means operative from the planter for rotating the drive member.

2. An assembly for dispensing seed contained in a seed hopper mounted on a planter comprising: a vertically disposed supporting shaft fixed to the hopper and extending into the hopper and having fixed thereto a radially extending gear shaft with gear means mounted thereon; a rotary drive member rotatably mounted on the supporting shaft and having a toothed surface engageable with the gear means for driving the latter; a hopper base plate fixed against rotation and having a seed discharge port spaced radially from the supporting shaft; an annular disk overlying the base plate and having peripheral seed cells; means connecting the disk to the drive member to cause the disk to rotate resulting in the seed cells passing over the seed discharging port; a lower agitating member rotatably mounted on the shaft and a portion overlying and containing the gear means with a lower edge thereof abutting the disk and including means thereon engageable with the gear means whereby said agitating member will rotate oppositely to the annular disk; an upper agitating member spaced vertically from the lower agitating member and mounted on said hub for rotation in unison with the lower agitating member; a ribbed member fixed against rotation and having arms disposed between the upper and lower agitating members; and drive means operative from the planter for rotating the drive member.

3. An assembly for dispensing seed contained in a seed hopper mounted on a planter comprising: a hopper base plate fixed against rotation and having a seed discharge port; a seed disk overlying the base plate and having peripheral seed cells operative upon rotation to pass over the seed discharging port; a lower agitating member mounted in the hopper above said disk; an upper agitating member spaced vertically from the lower agitating member and connected to the lower agitating member for rotation in unison with the latter; a ribbed member fixed against rotation and having arms disposed between the upper and lower agitating members; and drive means operative from the planter for rotating the disk in one direction and the agitating members in the opposite direction.

4. An assembly for dispensing seed contained in a seed hopper mounted on a planter comprising: a hopper base plate fixed against rotation and having a seed discharge port; a seed disk overlying the base plate and having peripheral seed cells operative upon rotation to pass over the seed discharging port; agitating means mounted in the hopper above said disk; drive means operative from the planter for rotating the disk in one direction; and agitator drive means operative from the disk member for rotating said agitating means in the opposite direction.

5. The invention defined in claim 4, in which the agitator drive means is in the form of a pair of crown gears connected to one another by a gear mounted on a shaft which is held against movement relative to the hopper, one of said crown gears being in fixed relation to the disk, the other of said crown gears being in a fixed relation to a portion of the agitating means.

6. The invention defined in claim 5, further characterized by said portion of the agitating means being formed to overlie and contain the agitator drive means.

7. An assembly for dispensing seed contained in a seed hopper comprising: a hopper base plate fixed against rotation and having a seed discharge port; a rotary disk overlying the base plate having seed cells operative to pass proximate to the seed discharging port and including a portion thereof having a toothed surface; a gear operative from the toothed surface and mounted on a gear support; means fixing the gear support against movement relative to the hopper; and an agitating member having a portion overlying and containing the gear member and toothed surface, said latter portion also having thereon a toothed surface engageable with the gear member thereby causing the agitating member to rotate in unison with and oppositely to the rotary disk.

8. An assembly for dispensing seed contained in a seed hopper comprising: a hopper base plate fixed against rotation and having a seed discharge port; a rotary disk overlying the base plate having seed cells operative to pass proximate to the seed discharging port and including a portion thereof having a toothed surface; a gear operative from the toothed surface and mounted on a gear support; means fixing the gear support against movement relative to the hopper; and an agitating member having a portion with a toothed surface thereon engageable with the gear member thereby causing the agitating member to rotate in unison with and oppositely to the rotary disk.

9. A seed agitating mechanism for use in a seed hopper having a rotary member which operates to periodically dispense seed from the hopper comprising: a first agitating member rotatably mounted in the hopper and having projections thereon operative upon rotation to move through the seed; a second agitating member spaced from the first agitating member rotatably mounted in the hopper and having projections thereon operative to move through the seed; means rigidly connecting the first and second agitating members; a rigid member mounted in the hopper and fixed against rotation and having projections extending between the first and second agitating members; and drive means operative from the rotary member for rotating the agitating members.

10. A seed agitating mechanism for use in a vertically disposed seed hopper having at its base a rotary disk with peripheral seed cells operative upon rotation to collect seed and to move the seed over a discharge port at the base of the hopper comprising: a vertically disposed supporting shaft fixed to the hopper and extending upwardly into the hopper; a lower agitating member positioned above the disk and having a hub portion rotatably mounted on the shaft and radially extending portions projecting into the hopper; an upper agitating member spaced vertically from the lower agitating member mounted on the hub for rotation in unison with the lower agitating member and having radially projecting portions extending into the hopper; a ribbed member mounted on the hopper and fixed against rotation and having rigid extending portions positioned between the upper and lower agitating members, and drive means operative from the disk for rotating the agitating members in a direction of rotation oppositely to the direction of rotation of the disk.

11. An assembly for dispensing seed contained in a seed hopper comprising: a hopper base plate fixed against rotation and having a seed discharge port; a rotary disk overlying the base plate having seed cells operative to pass proximate to the seed discharging port and including a portion thereof having a toothed surface; a gear operative from the toothed surface and mounted on a gear support; means fixing the gear support against movement relative to the hopper; an agitating member having a portion with a toothed surface thereon engageable with the gear member thereby causing the agitating member to rotate in unison with and oppositely to the rotary disk; a rigid member fixedly but removably mounted in the hopper; a pivot member mounted on the rigid member; a first elongated part mounted on the pivot member for movement toward or away from the rotary disk and having a surface operative to slidably engage the rotary disk thereby limiting the quantity of seed in the cells; a second elongated part mounted on the pivot member and having a seed-ejecting portion substantially in alinement with the seed discharge port and including a projection on the portion operative to move in and out of the seed cells upon rotation of the disk thereby discharging seed from the cells and through the discharge port; one-way stop means mounted on one of said elongated parts and positioned to intercept the other elongated part thereby limiting movement of the parts toward one another; and means extending between the rigid member and the elongated parts biasing the parts toward the disk and toward one another whereby upon removal of the rigid member from the planter the elongated parts will be biased to a position to cause said other elongated part to engage the stop means.

12. An assembly for dispensing seed contained in a seed hopper mounted on a planter comprising: a hopper base plate fixed against rotation and having a seed discharge port; a seed disk overlying the base plate and having peripheral seed cells operative upon rotation to pass over the seed discharging port; a lower agitating member mounted in the hopper above said disk; an upper agitating member spaced vertically from the lower agitating member and connected to the lower agitating member for rotation in unison with the latter; a member fixed against movement and having portions thereof disposed between the upper and lower agitating members; and drive means operative from the planter for rotating the disk in one direction and the agitating members in the opposite direction.

13. An assembly for dispensing seed contained in a seed hopper mounted on a planter comprising: a hopper base plate fixed against rotation and having a seed discharge port; a seed disk overlying the base plate and having peripheral seed cells operative upon rotation to pass over the seed discharging port; agitating means mounted in the hopper above said disk; drive means operative from the planter for rotating the disk in one direction and including agitator drive means for rotating said agitating means in the opposite direction.

References Cited in the file of this patent

UNITED STATES PATENTS

| | | |
|---|---|---|
| 650,772 | Avery | May 29, 1900 |
| 930,106 | Towle | Aug. 3, 1909 |
| 1,110,935 | Heylman | Sept. 15, 1914 |
| 1,275,333 | Waterman | Aug. 13, 1918 |
| 1,936,105 | Cole | Nov. 21, 1933 |
| 2,527,862 | Walz et al. | Oct. 31, 1950 |
| 2,647,662 | Oehler | Aug. 4, 1953 |